3,553,624
ANTI-DROOP THERMOSTAT
James W. Dalzell, Herbert T. Hazleton, and John B. Thorsteinsson, Brandon, Manitoba, Canada, assignors to Pioneer Electric Brandon Limited, Brandon, Manitoba, Canada, a Canadian corporation
Continuation-in-part of application Ser. No. 530,485, Feb. 28, 1966. This application Mar. 28, 1969, Ser. No. 811,393
Int. Cl. H01h 37/14, 37/52
U.S. Cl. 337—377
5 Claims

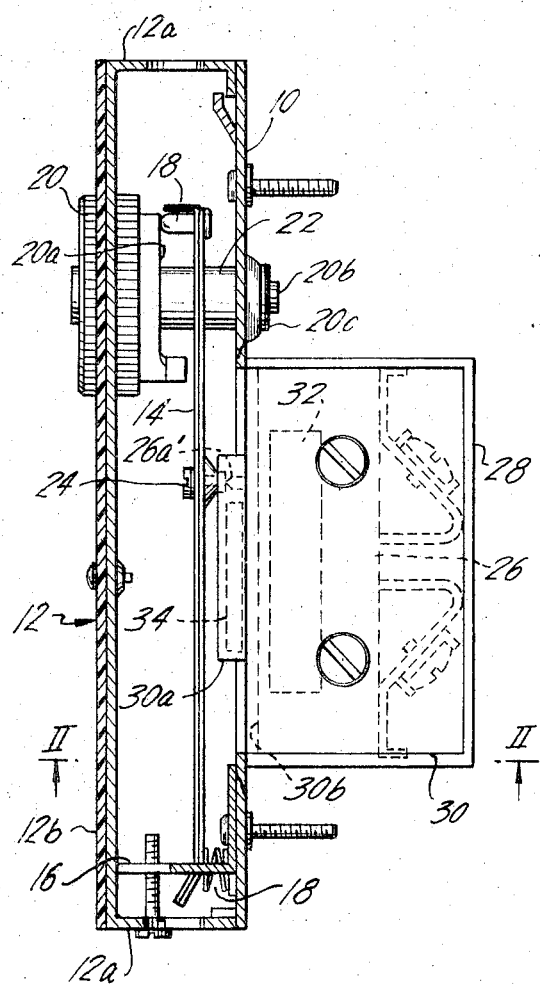
FIG. 1
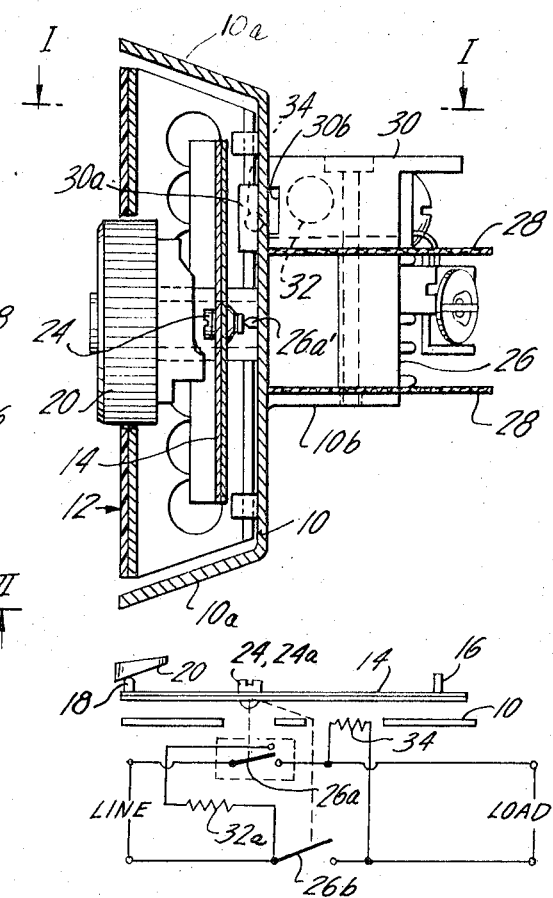
FIG. 2
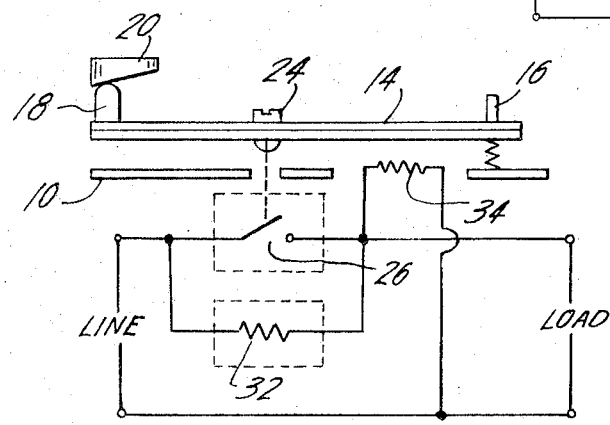
FIG. 3
FIG. 3A
INVENTORS.
JOHN BJARNI THORSTEINSSON
HERBERT TORRENCE HAZLETON
JAMES WELLAND DALZELL
BY Paul S. Martin
ATTORNEY United States Patent Office 3,553,624
Patented Jan. 5, 1971

ABSTRACT OF THE DISCLOSURE

Thermostats having a temperature responsive bimetal mechanically coupled to a switch are affected variably by heat from the switch reaching the temperature sensing bimetal. A heating element is provided which is turned on during the times when the switch is turned off so that a consistent amount of heat from the combined switch and heating element reaches the bimetal and can be taken into account in adjusting the thermostat. The heating element has a thermal inertia that approximates the thermal inertia of the switch.

This is a continuation-in-part of application Ser. No. 530,485 filed Feb. 28, 1966.

The present invention is concerned with thermostats for controlling the heating or cooling of a room. In particular the invention is concerned with so-called line voltage thermostats, wherein the heavy load current required by an electric heater of a room or by a room air conditioner is carried by switching means that forms part of the thermostat.

The switching means that forms part of line voltage thermostats is proportioned to carry and to switch relatively heavy load current. The line current supplied to a room electric heater (for example) is switched on and off by switching means that forms part of a line voltage thermostat. This contrasts with the low levels of current carried by the switch in a thermostat designed for controlling a relay (so-called "low-voltage" thermostats) wherein the relay carries and switches the load current. Both kinds of thermostats are commonly mounted on a wall of a room. In case of a low-voltage thermostat, the relay containing the high-current-switching contacts is installed in the controlled equipment, remote from the thermostat.

The flow of relatively heavy current through the switch of a line-voltage thermostat produces a significant amount of heat. This heat tends to modify the temperature in the ambient temperature sensing zone of the thermostat. The effect is small in mild weather, when the switch is closed for only short periods, with relatively long intervening periods when the switch is open. On the other hand, when an electric room heater (or air conditioner) is called upon to operate for long periods with only short interruptions, then a substantial amount of heat is produced by the current flow through the thermostat switch. The temperature in the ambient-temperature measuring zone is raised significantly by this heat. The temperature sensing element "sees" a higher temperature than actually prevails in the room and, accordingly, tends to control the temperature modifying apparatus of the room so as to establish a lower temperature in the room than that for which the thermostat is set. This effect is called "droop." Droop has been a persistent, troublesome characteristic of line-voltage thermostats.

An object of the present invention resides in providing a line-voltage thermostat of economical construction having a controlled droop characteristic and, more particularly, a line-voltage thermostat characterized by minimum or even zero droop, as desired.

Wall thermostats are usually mounted on a wall of a room remote from the outside walls of a building. Consequently, during periods of extreme cold weather, the thermostat does not sense a temperature corresponding to that which develops in the room near the outside walls, and the personal comfort of the occupants suffers. Some people consider it desirable to adjust a thermostat to a higher setting during periods of extreme cold weather in order to have a more comfortable room i.e. to compensate somewhat for the cold-wall effect.

A further object of the invention resides in providing line-voltage thermostats with what may be called a "negative droop" or "rise" characteristic for controlling room heating, for automatically raising the set-point so as to combat the cold-wall effect during really cold weather.

In achieving the foregoing objects, a supplementary heater is incorporated in a line-voltage thermostat to develop heat during those time intervals when the switch is off and when the load current that ordinarily produces heat in the switch is interrupted. The supplementary heater is proportioned and located in relation to the temperature sensing zone and to thermal masses of the thermostat so as to have approximately the same heating effect while the heater is on, as the heating effect of the switch while the switch carries load current. The supplementary heater is proportioned to have the same thermal inertia as the thermostat switch. Also, it is so located as to have the same lag as the switch in its influence on the ambient temperature measuring zone. With such a relationship, the effect on the bimetal of the thermostat due to the heat produced in the supplementary heater while it is energised will exactly balance the heat produced in the switch while the switch is carrying load current. The effect of the switch and such a heater, together, is a constant, insofar as the ambient temperature measuring zone is concerned. The effect is the same under conditions when the heater is on for short periods of time and the switch is on for long periods as when the heater is on for long periods of time and the switch is on for short periods. Such a system would exhibit zero droop regardless of prevailing outdoor temperatures. The resistor may be a multi-tap unit, or various sizes of resistors may be chosen from a supply, in order for a given thermostat to have zero-droop characteristics when controlling various sizes of heating loads.

If the amount of heat of the supplementary resistor is not exactly matched to the heating effect produced in the switch itself, the use of a supplementary heating resistor produces a distinctive improvement, drastically reducing the droop or in some instances producing a negative droop or rise. Consequently, exact match between the supplementary heating resistor and the heating effect of the switch is not essential for improved thermostat performance. Moreover, if the resistor is deliberately chosen in relation to the load current through the thermostat switch so as to produce a rise characteristic, the comfort of a room heated under control of a thermostat can be improved so as to reduce or overcome the "cold wall" effect that prevails during periods of extreme cold weather.

The anti-droop supplementary heater discussed above is applicable to many forms of line voltage thermostats. It is utilized in the thermostat in the above-mentioned application Ser. No. 530,485 wherein a shield subdivides the air space of the ambient temperature sensing zone between the switch and the bimetal so as to form two air spaces. However, the anti-droop supplementary heater is capable of providing dramatic improvement in the operation of commonly available thermostats wherein there is only one air space behind the bimetal and where the heat of the switch reaching the ambient temperature sensing zone of the bimetal causes serious droop. For this reason the form of thermostat to which the present invention is applied in the illustrative embodiment described below is typical of the widely known one-air-space thermostats.

The nature of the invention and its various advantages, objects and features will be more fully appreciated from the following detailed description of an illustrative embodiment which is shown in the accompanying drawings, wherein:

FIG. 1 is a vertical cross section through a wall thermostat constituting an embodiment of the invention, as viewed mainly from the plane I—I in FIG. 2;

FIG. 2 is a cross section of the thermostat of FIG. 1 viewed from the plane II—II in FIG. 1; and FIG. 3 is a wiring diagram showing the use of the thermostat of FIGS. 1 and 2 and diagramamtically illustrating that thermostat, and FIG. 3A is a modification thereof.

In the drawings, the illustrated thermostat includes a frame plate 10 that has bent-up side walls 10a and a cover 12 having top and bottom closure portions 12a in which there are formed many openings accommodating relatively free convection currents of air normally occurring at an inside wall of a room. Cover 12 is formed with a decorative front panel 12b that may be changed to suit the decor. An ambient temperature measuring zone is constituted between frame plate 10 and cover 12. Ambient temperature sensing bimetal 14 is mounted in this temperature sensing zone. At its lower extremity, bimetal 14 is pressed against an edge of sheet-metal member 16 by a pair of laterally spaced coil springs 18, member 16 acting as a fulcrum for bimetal 14 as it flexes in its normal operation. Remote from fulcrum 16, bimetal 14 carries a button 18 that is to bear against the lower cam surface 20a of an adjusting knob 20 of the thermostat. This knob is fixed on a shaft 20b in a tube 22 that is secured to frame plate 10 and serves as the rotational bearing for shaft 20b. A split washer 20c in a groove in shaft 20b determines the location of the active surface of cam 20a, in relation to frame plate 10. An adjusting screw 24 in bimetal 14 is disposed near the middle of bimetal 14 between fulcrum 16 and button 18 for operating snap switch 26. The latter is secured to a bracket 10b struck out of the back panel of the frame plate. Switch 26 is a typical snap switch that has an overcentering spring arrangement for snap-closing the contacts and snap-opening the contacts in response to pressure against the controlling button 26a' of the switch and to release of pressure.

Adjacent to switch 26 and in good thermal contact therewith (although separated therefrom by a thin interposed sheet of electrical insulation 28) is a unit 30 of molded plastic and having suitable electrical terminals thereon. Member 30 is formed as a hollow element and contains a supplementary heating resistor 32. A suitable compound fills the space about resistor 32 in the cavity of unit 30, so that resistor 32 is in good heat transfer relation to the entire body of member 30. This entire unit 30–32 is screwed in good heat-transfer relation to a wide area of the body of switch 26 so that the switch body and the resistor unit 30, 32 act essentially as a unitary thermal mass.

The front portion 30a of member 30 provides for mounting and mechanical protection of an anticipator resistor 34. This resistor is supported at the front of frame plate 10, adjacent to the bimetal 14. Below portion 30a there is a vertical air passage 30b that provides for a substantial degree of thermal isolation between anticipator resistor 34 and the supplemental heater 32 in its block 30. Due to this isolation, and its limited bulk and relatively large area, and its position in the convection air passage behind the bimetal, resistor 34 has little thermal inertia. Its temperature rises relatively promptly when it is energized and its temperature drops relatively fast when it is de-energized.

The electrical circuit of the thermostat and its load is illustrated in FIG. 3. Bimetal 14 is restrained by cam 20 and fulcrum 16 so that a drop in ambient temperature drives adjusting screw 24 against button 26a' of snap switch 26. Anticipator resistor 34 is a fraction of a watt and is connected in parallel with the load so as to be turned on and off as heating current is supplied and interrupted. Supplementary heating resistor 32 forms a current path that bypasses switch 26 and is connected in series with the load, e.g. a room heater. Accordingly, when switch 26 is closed and the room heater is energized, anticipator resistor 34 is heated. During the times when the room heater is de-energized, switch 26 is open and supplementary heating resistor 32 develops heat. The low value of the load resistance (being typically of the order of several kilowatts) effectively short-circuits the anticipator resistor when the supplementary heater is energized, so that the anticipator does not develop appreciable heat at such times. Supplementary heater 32 ordinarily draws a fraction of a watt, chosen for zero droop or slight rise to match or slightly exceed the heating effect produced in snap switch 26 by the load current.

Resistor 34 is disposed close to the bimetal so as to influence the bimetal during the times when heating current is supplied to the load. It is designed to have very low thermal inertia. On the other hand, switch 26 and its casing inherently represents a bulky unit that has a substantial amount of thermal inertia. The temperature rise in switch 26 has a lag due to its thermal mass, so that the switch temperature rises gradually each time the switch closes and starts to carry current. Supplementary heater 32 and its case 30 form a unit that has substantial thermal mass, and (like switch 26) there is relatively limited surface area for dissipating the heat it develops. Thus, unit 30, 32 tends to have substantial thermal lag essentially matching the thermal lag of switch 26. Further, since switch 26 and unit 30, 32 are in intimate thermal transfer relation to each other, they tend to act as a common thermal mass and tend to maintain the same effective temperature regardless of which of them is off while the other is carrying current. Each unit, though it is shown as a separate part, acts as a portion of the thermal mass of the other, and both transfer heat to the thermal mass represented by plate 10. Therefore, switch 26 and unit 30, 32 tend to develop a uniform, constant temperature provided that resistor 32 is chosen to have the same heating effect as that produced in the switch by the load current. Their combined effect on the ambient temperature measuring zone is constant.

The effect of the heat produced by the switch and the supplementary heating resistor in modifying the ambient temperature in the temperature sensing zone can be taken into account in the calibration of the thermostat, or the thermostat may be adjusted to provide a comfortable temperature in a given installation. Of importance is the fact that, whatever the temperature setting, the actual set point of the thermostat will be held constant regardless of the duration of the open times and close times of the switch during mild outdoor conditions and during very cold weather.

As mentioned earlier it is possible to produce a negative droop or rise characteristic by proportioning resistor 32 in such a fashion that it produces somewhat more heat than that resulting from flow current in switch 26. Further, it may not be considered critical for resistor 32 to match exactly the heating effect of the load current in switch 26. Slight mismatch may be eminently satisfactory, especially in the direction to provide a rise characteristic. A given droop-controlled thermostat may be adapted for use with various sizes of room heaters by making resistor 32 variable (as by providing multiple taps) or various units 30, 32 may be chosen from stock for matching a given thermostat to any given load and for providing the desired anti-droop characteristic. Moreover, the resistor 32 may be incorporated in the switch itself so as to act precisely as a single constant-temperature element.

There are some geographical areas and some specifications where thermostats are required to include an "off" setting of the adjustment knob, for completely disconnecting the load. FIG. 3A represents a modification of the circuit and thermostat in FIG. 3 for incorporating provision for meeting such requirements. In FIG. 3A switch 26a replaces switch 26 in the thermostat at one side of the line-to-load circuit, and another switch 26b is included between the line and load terminals in the opposite conductor of the line-load circuit. (It should be understood that where both sides of the line are to be disconnected, this system will ordinarily be a 240 volt circuit where each of the line-to-load conductors is energized at 120 volts above ground and there is a third, neutral conductor in the system. The neutral conductor is not illustrated.) Screws 24, 24a couple these switches mechanically to the bimetal so as to assume the illustrated position when the operating knob is adjusted to its off position. Switch 26a is a single-pole double-throw switch, arranged to connect one line terminal to resistor 32a in the illustrated position of the switches. The other terminal of resistor 32a is connected to the opposite terminal of the line. Either one of the switches 26a or 26b is arranged to be operated by a screw 24 or 24a in the bimetal so as to turn the load on and off at a set-point temperature of the thermostat. The other switch is also operable by bimetal 14 but preferably that other switch is not operated from its "closed position" (opposite the position illustrated) except in the "off" setting of the thermostat.

Accordingly, during operation of the thermostat to supply load current to the electric heater of the room, both switches 26a and 26b are in a position opposite to that illustrated. When the adjusted temperature of the thermostat is reached, one of the two switches is operated by bimetal 14 into the position shown in FIG. 3A. Resistors 32a and 34 are, accordingly, energized and de-energized in alternation with each other, and they are located and proportioned alike in the thermostats of FIGS. 3 and 3A. The performance of the circuit of FIG. 3A is the same as that of FIG. 3 with the added effect in FIG. 3A that, by operating the control knob to the off position, both sides of the line-to-load circuit are interrupted.

The nature of the invention is such that it may assume a wide variety of physical forms within the choice of those skilled in the art, and therefore the invention should be construed broadly in accordance with its full spirit and scope.

What I claim is:

1. A line voltage thermostat having anti-droop or rise characteristics, including switching means adapted to carry the load current of temperature modifying apparatus in a room whose ambient temperature is regulated by the thermostat, an ambient temperature sensing element in a temperature sensing zone of the thermostat, said temperature sensing element being coupled to said switching means in control thereof and being inherently disposed in limited heat-transfer proximity thereto, said switching means developing heat due to load current flowing therein and causing a significant, enduring temperature rise in said temperature sensing zone after protracted periods of load-current flow, the thermal mass and limited heat-dissipation of said switching means and its separation from said temperature sensing element constituting effective thermal inertia, the temperature rise produced by the switching means in the ambient temperature sensing zone lagging the temperature rise of the switching means itself because of said thermal inertia, supplemental heating means in said thermostat having a thermal inertia, location and resistance value that approximates the heating effect in the ambient temperature sensing zone, due to the load current in said switching means, said thermostat including means for energizing said supplemental heating means during the times when said switching means interrupts the load-current circuit, thereby to control the temperature effects in said temperature sensing zone caused by the alternating periods of load-current flow and interruption thereof in said switching means.

2. A line-voltage thermostat in accordance with claim 1 wherein said supplemental heating means is proportioned for producing approximately the same amount of heat per unit of conduction time as said switching means, for avoiding the droop that would otherwise be occasioned by periodic flow of current in said switching means.

3. A line-voltage thermostat in accordance with claim 1 wherein said switching means comprises a snap switch, wherein said thermostat includes a mounting plate to the rear of which said snap switch is mounted, wherein said temperature sensing element is a bimetal in front of said mounting plate, and wherein said thermostat includes mechanical means for coupling said bimetal to said snap switch.

4. A line-voltage thermostat in accordance with claim 1, wherein said supplemental heating means is proportioned for producing more heat per unit of conduction time than said switching means, thereby producing a "rise" characteristic.

5. A line-voltage thermostat in accordance with claim 2, wherein said switching means comprises a snap switch, wherein said thermostat includes a mounting plate to the rear of which said snap switch is mounted, wherein said temperature sensing element is a bimetal in front of said mounting plate, and wherein said thermostat includes mechanical means for coupling said bimetal to said snap switch.

References Cited

UNITED STATES PATENTS

| | | | |
|---|---|---|---|
| 3,463,008 | 8/1969 | Teichert et al. | 337—377(UX) |
| 3,339,043 | 8/1967 | Baak | 37—103(X) |
| 3,277,260 | 10/1966 | Anderson | 337—377(X) |
| 2,847,536 | 8/1958 | Bishop | 337—103 |
| 3,059,078 | 10/1962 | Hall | 337—107(X) |

OTHER REFERENCES

German printed application, DAS 1154555, September 1963, Thouzellier, 337–103.

BERNARD A. GILHEANY, Primary Examiner

D. M. MORGAN, Assistant Examiner

U.S. Cl. X.R.

337—100, 102